F. C. BLAIR.
AGRICULTURAL MACHINE.
APPLICATION FILED APR. 22, 1914.
1,117,312.
Patented Nov. 17, 1914.
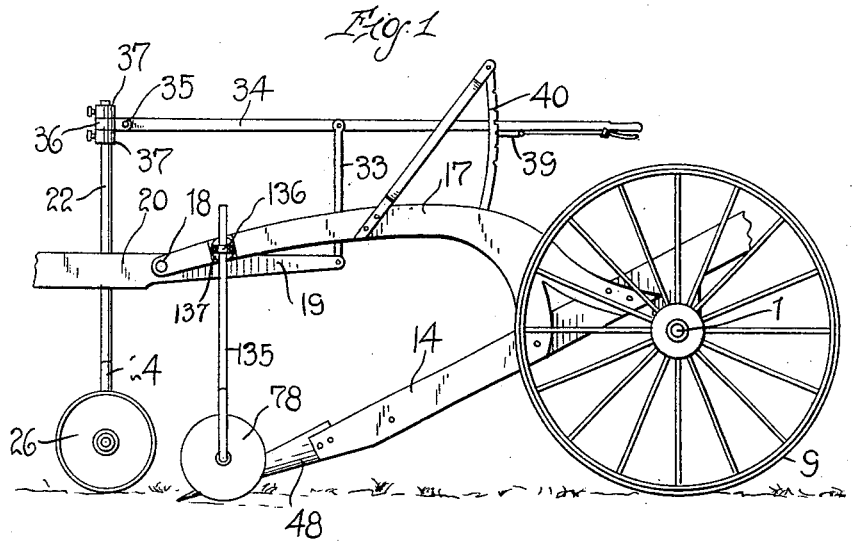
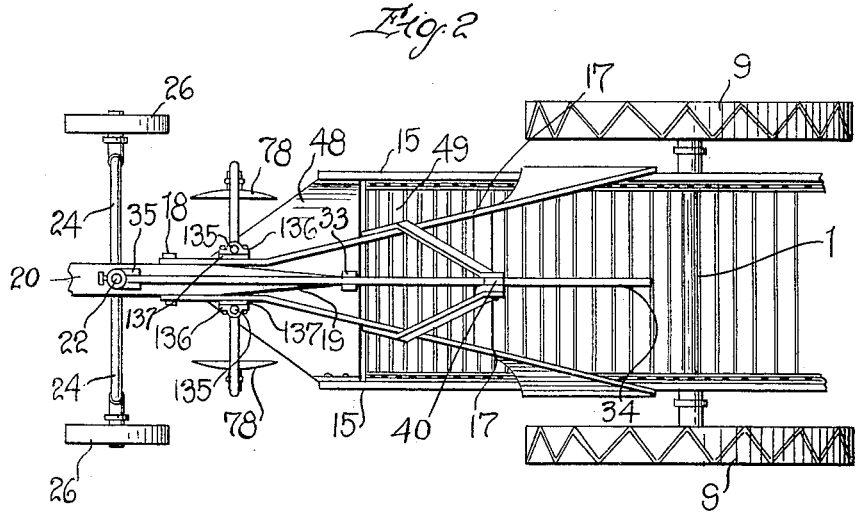
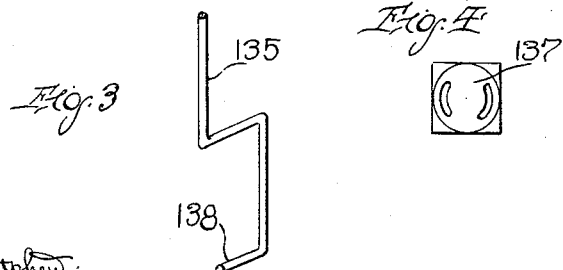
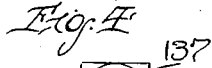
Inventor
F. C. BLAIR

UNITED STATES PATENT OFFICE.

FRED C. BLAIR, OF KALISPELL, MONTANA.

AGRICULTURAL MACHINE.

1,117,312.  Specification of Letters Patent.  Patented Nov. 17, 1914.

Original application filed January 24, 1914. Serial No. 814,209. Divided and this application filed April 22, 1914. Serial No. 833,775.

*To all whom it may concern:*

Be it known that I, FRED C. BLAIR, a citizen of the United States, residing at Kalispell, in the county of Flathead and State of Montana, have invented certain new and useful Improvements in Agricultural Machines, (being a division of my copending application, filed January 24, 1914, Serial No. 814,209,) of which the following is a specification, reference being had to the accompanying drawings.

This invention relates to certain improvements in agricultural machines and has relation more particularly to a machine of this general character especially designed and adapted for use in harvesting tubers, such as potatoes or the like, and being a division of my copending application, Serial No. 814,209, filed January 24, 1914; and the object of the invention is to provide a device of this general character having novel and improved means whereby the tubers are effectively collected after being lifted from the soil, such means also serving to effectively cut the vines and the like.

The invention consists in the details of construction and in the combination and arrangement of the several parts of my improved machine whereby certain important advantages are attained and the device is rendered simpler, less expensive and otherwise more convenient and advantageous for use, all as will be hereinafter more fully set forth.

The novel features of the invention will be carefully defined in the appended claim.

In order that my invention may be the better understood, I will now proceeed to describe the same with reference to the accompanying drawings, wherein—

Figure 1 is a fragmentary view in elevation of an agricultural machine embodying my improvements; Fig. 2 is a top plan view of the device as set forth in Fig. 1; Fig. 3 is a fragmentary view, in perspective, of a supporting rod for a disk herein included; and Fig. 4 is a detail view, detached, of a connecting casting for the disks, as herein set forth.

The present application is a division of my copending application, filed January 24, 1914, Serial No. 814,209, and for this reason certain of the parts illustrated in the accompanying drawings are not referred to or described in detail.

As disclosed in the accompanying drawings, 1 denotes the main supporting axle of requisite dimensions having suitably engaged with its opposite extremities the traction wheels 9 and operatively supported by such axle 1 is the main frame 14 of predetermined dimensions and herein disclosed as including the spaced side sections 15—15 between which is adapted to operate the conveyer 49.

Projecting upwardly and forwardly from each of the side members 15 of the frame 14 are the substantially arcuate members 17 having their forward ends pivotally connected, as at 18, intermediate of the rear portion 19 of the tongue beam 20. 22 denotes a vertical post directed through the tongue 20 and provided at its lower extremity with the yoke 24 on which are mounted the front supporting wheels 26. In order that the frame 14 may be raised or lowered as desired, I pivotally connect with the rear extremity of the rear portion 19 of the tongue beam 20, the link 33 which is also in pivotal engagement with the lever 34 disposed above the beam 20 and in substantial parallelism therewith, the forward extremity of such lever being pivotally secured, as at 35, to the collar 36 loosely supported on the post 22 and maintained against endwise movement thereon through the medium of the collars 37 clamped to such post and on opposite sides of the collar 36 and with which such collar 36 is adapted to contact, as is believed to be self-evident. The opposite extremity of the lever 34 is adapted to terminate in convenient proximity to the seat (not shown) and is provided with the latch 39 adapted to coact with the vertically disposed rack 40 supported by the arms 17 whereby it will be readily perceived that an effective means is afforded whereby the frame 14 may be locked in its different adjustments.

Operatively connected with the forward or lower end of the frame 14 is the digging point or plow 48 adapted to penetrate the soil in order to lift the tubers of the plants, the extent of penetration of such digger or plow 48 being, as is thought to be self-evident in view of the foregoing, under control of the lever 34. The digger or plow 48 is of such formation that the plants lifted thereby from the soil are caused to be deposited upon the upper stretch of the conveyer 49.

Positioned at opposite sides of the digger or plow 48 are the harrow disks 78 which, in addition to cutting the vines and the like, serve to assure the collection of all the tubers upon the point or digger 48. As herein disclosed, the disks 78 are mounted on the spindles 138 formed at the lower ends of the supporting rods 135, the upper extremity of each of such rods being adjustably directed through a clamping member 136 and the casting 137, such member 136 being connected to the casting in such a manner as to be capable of limited oscillatory movement, the particular form of casting being illustrated in Fig. 4.

From the foregoing description, it is thought to be obvious that an agricultural machine constructed in accordance with my invention is of an extremely simple and comparatively inexpensive nature and is particularly well adapted for use by reason of the convenience and facility with which it may be assembled and by reason of the effectiveness with which it performs its functions, and it will also be obvious that my invention is susceptible of some change and modification without material departure from the principles and spirit thereof and for this reason I do not wish to be understood as limiting myself to the precise arrangement and formation of the several parts herein shown in carrying out my invention in practice.

I claim:

A device of the character described comprising a supporting axle, a frame operatively connected therewith, a digging implement carried by the frame, a tongue beam, forwardly directed arms carried by the frame and overlying the digging implement, said arms having their forward extremities engaged with the tongue beam, castings secured to the outer faces of the arms adjacent their pivotal connections, bearings operatively engaged with the castings and capable of a limited oscillatory movement relative thereto, substantially vertically disposed supporting rods adjustably secured to the bearings, and disks rotatably supported by the lower extremities of the rods.

In testimony whereof I hereunto affix my signature in the presence of two witnesses.

FRED C. BLAIR.

Witnesses:
W. N. NOFFSINGER,
HANS WALCHLI.